Oct. 30, 1962 — A. R. SMITH — 3,060,583
COMPENSATING ARRANGEMENTS
Filed June 27, 1960
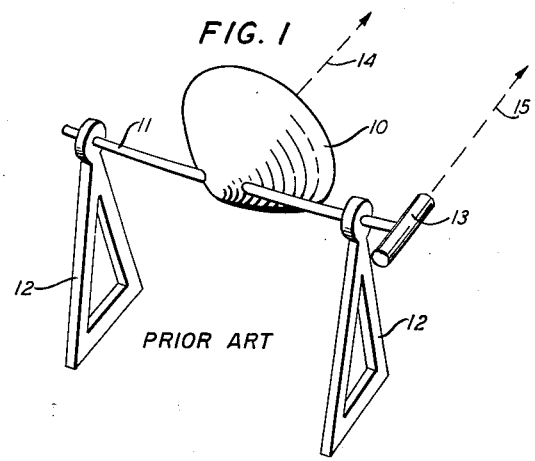
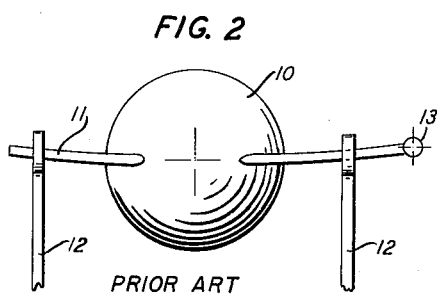
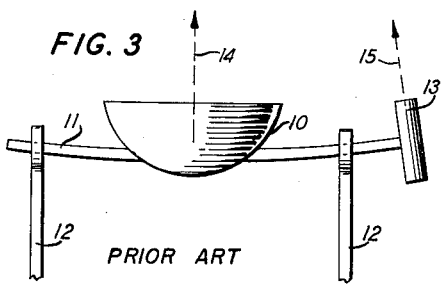
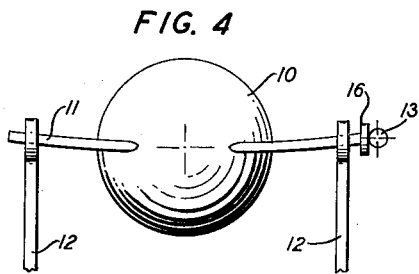
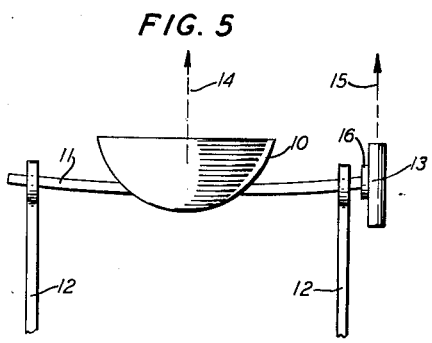
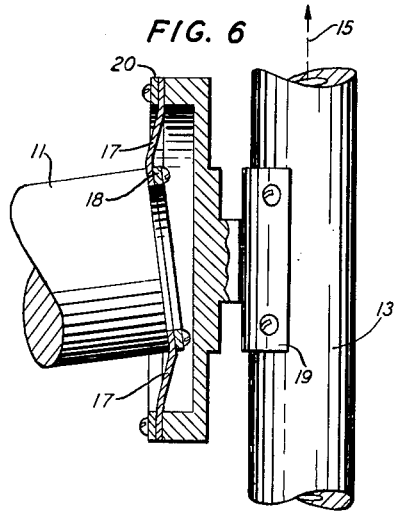
INVENTOR
A.R. SMITH
BY
ATTORNEY United States Patent Office 3,060,583
Patented Oct. 30, 1962

3,060,583
COMPENSATING ARRANGEMENTS
Arnold R. Smith, Morristown, N.J., assignor to Bell Telephone Laboratories, Incorporated, New York, N.Y., a corporation of New York
Filed June 27, 1960, Ser. No. 39,188
5 Claims. (Cl. 33—46)

The present invention relates to compensating arrangements and in particular to arrangements for maintaining the sight paths of two pieces of apparatus substantially parallel for all elevation angles of the sight paths.

When a piece of apparatus, such as an antenna, is mounted on a horizontal shaft supported near its extremities, the shaft experiences a deflection. This deflection may remain constant for all rotational positions of the shaft or may change as a function of the rotational position of the shaft. The latter type of deflection occurs, for example, when an antenna is mounted in a gimbal so that the moment of inertia of the shaft in a plane normal to the axis of the shaft is not the same in all directions. In either case, the deflection of the shaft presents a problem when another piece of apparatus, such as an optical system, is rigidly attached to an extremity of the shaft and it is desired to have sight paths associated with the respective pieces of apparatus remain substantially parallel for all elevation angles of the sight paths. In particular, although the pieces of apparatus may be adjusted so that their sight paths are substantially parallel in their horizontal positions, the sight paths toe-in with respect to one another as they are raised in elevation. This effect produces sighting errors which are in excess of those permissible in some applications.

An object of the present invention is to substantially eliminate the above-described toe-in effect.

In accordance with the present invention in one of its broader aspects, a flexible member is used to attach a first piece of apparatus to an extremity of a shaft on which a second piece of apparatus is mounted. In particular, the member is affixed to the shaft so that in their unstressed conditions their center lines are substantially parallel; the member is chosen so that the ratios between the angular deflections of the shaft and the member are substantially constant when the shaft and the member are deflected in any direction by a pair of constant parallel forces, respectively; the first piece of apparatus is adjusted so that its sight path is substantially parallel to that of the second piece of apparatus when the sight paths are horizontal; and the bending moment produced by the first piece of apparatus on the member is chosen so that the sight paths are substantially parallel when they are other than horizontal. By this arrangement, the member maintains substantial parallelism between the sight paths for all elevation angles; that is, the first piece of apparatus sight path is caused to "track" the second piece of apparatus sight path with a high degree of accuracy.

In each of several embodiments of the invention the flexible member comprises an annularly shaped diaphragm having its inner periphery affixed to an end of an antenna elevation shaft while its outer periphery is affixed to and supports an optical system. In one of these embodiments the shaft has a substantially constant deflection for all elevation angles while the diaphragm has a uniform thickness. Because of the constant deflection of the shaft and the uniform thickness of the diaphragm, the ratios between the angular deflections of the shaft and the diaphragm are substantially constant for all elevation angles. In another of these embodiments, the shaft has a deflection which changes with the elevation angle while the diaphragm has a non-uniform thickness to maintain substantially constant the ratios between the angular deflections of the shaft and the diaphragm for all elevation angles. An outstanding advantage of the invention resides in the fact that it automatically compensates for differing gravity accelerations.

Other objects and features of the invention will be apparent from a study of the following detailed descriptions of several specific, illustrative embodiments.

In the drawings:

FIGS. 1, 2 and 3 are simplified drawings illustrating the sight path toe-in effect produced when a telescope is rigidly attached to an end of an antenna elevation shaft;

FIGS. 4 and 5 are simplified drawings illustrating the horizontal and vertical positions of an antenna structure embodying the invention; and FIG. 6 discloses a flexible member that may be used in practicing the invention.

The sight path toe-in effect produced when a telescope is rigidly attached to an end of an antenna elevation shaft and the shaft is rotated is illustrated in FIGS. 1, 2 and 3. FIG. 1 shows, in perspective, an antenna 10 mounted at the midpoint of a horizontal shaft 11, a pair of supports 12 supporting shaft 11 and a telescope 13 rigidly attached to an end of shaft 11. The weight of antenna 10 causes shaft 11 to deflect as shown, the deflection being exaggerated for illustrative purposes. (The formula for obtaining the angular deflection of shaft 11 is well known and appears, for example, in the sixth figure on page 18 of Design of Machine Elements, second edition, authored by M. F. Spotts and published by Prentice-Hall, Inc.) Antenna 10 and telescope 13 are oriented so that their respective sight paths 14 and 15 are parallel with respect to one another when in their horizontal or zero degree elevation angle positions as illustrated in FIG. 1. This is also illustrated in FIG. 2 which is an elevational view of the configuration of FIG. 1. To simplify the explanation, sight paths 14 and 15 are shown perpendicular to shaft 11 at their points of intersection.

FIG. 3 is a rear view of the configuration of FIG. 1 for an elevation angle of ninety degrees. Because of the horizontal nature of the portion of shaft 11 where antenna 10 is mounted, antenna sight path 14 remains in a vertical plane for all elevation angles and is therefore shown vertically in FIG. 3. The non-horizontal nature of the portion of shaft 11 where telescope 13 is attached, however, causes telescope sight path 15 to increasingly toe-in with respect to antenna sight path 14 as the elevation angle is increased. The toe-in of sight path 15 with respect to sight path 14 for an elevation angle of ninety degrees is illustrated in FIG. 3. It should be noted that sight path 15 in FIG. 3 is still perpendicular to the incremental portion of shaft 11 where telescope 13 is attached and that it is the non-horizontal nature of this incremental portion of the shaft that causes the toe-in effect. Furthermore, this toe-in effect occurs both for a shaft deflection that is constant for all elevation angles and for a shaft deflection that changes with changes in the elevation angle.

FIGS. 4 and 5 are simplified drawings illustrating the horizontal and vertical positions of an antenna embodying the invention. As in the previous drawings, an antenna 10 is mounted at the midpoint of a shaft 11 which is supported near its extremities by a pair of supports 12. FIG. 4 is a rear view showing antenna 10 at a zero degree elevation angle while FIG. 5 is a rear view showing antenna 10 at a ninety degree elevation angle. Antenna sight path 14 is shown vertically in FIG. 5 for the same reason presented with respect to FIG. 3. A telescope 13 is attached to an extremity of shaft 11 by a flexible member 16 so that the center lines of shaft 11 and member 16 in their unstressed conditions are substantially parallel. Member 16 is chosen so that the ratios between the angular deflections of shaft 11 and member 16 are substantially constant for all elevation angles. Telescope 13 is adjusted so that its sight path 15 is substantially parallel to antenna sight path 14 when antenna sight path 14 is at a zero degree elevation angle. The bending moment produced by telescope 13 on member 16 is then selected in a conventional manner by choosing the length of the moment arm and the mass of telescope 13 so that sight paths 14 and 15 are substantially parallel for an elevation angle other than zero degrees. This is shown in FIG. 5 for an elevation angle of ninety degrees. By this arrangement member 16 maintains substantial parallelism between sight paths 14 and 15 for all elevation angles; that is, telescope sight path 15 is caused to track antenna sight path 14.

FIG. 6 discloses a flexible member that may be used in practicing the invention. This member comprises an annular diaphragm 17 whose inner periphery is affixed to the end of shaft 11 by a clamping ring 18 and whose outer periphery is affixed to a bracket 19 by a clamping ring 20. Telescope 13 is attached to bracket 19. Shaft 11 is shown in its ninety degree elevation angle position as in FIG. 5. It should be noted that the bending moment produced by telescope 13 on diaphragm 17 causes the diaphragm to deflect to the extent that telescope sight path 15 is vertical and thereby substantially parallel to antenna sight path 14. The deflections are again exaggerated for clarity. The thickness of diaphragm 17 is selected to maintain substantially constant the ratios between the angular deflections of the shaft and the diaphragm for all elevation angles. When, for example, the shaft deflection is constant for all elevation angles, diaphragm 17 has a uniform thickness. The deflection angle formula for such a diaphragm is well known and appears, for example, on page 289 of Theory of Plates and Shells, second edition, authored by Timoshenko and Woinowsky-Krieger and published by McGraw-Hill Book Company.

Although the invention has been described in connection with maintaining substantial parallelism between the sight paths of an antenna and telescope, it is to be understood that it is applicable to the maintenance of substantial parallelism between the sight paths of any two pieces of apparatus. Furthermore, although only one particular flexible member has been disclosed in detail, it is to be understood that any member having the above-defined characteristics may be used without departing from the spirit and scope of the invention.

What is claimed is:

1. In combination a shaft, a first device having a sight path associated therewith and mounted on said shaft, a flexible member affixed to one extremity of said shaft so that the center lines of said shaft and member when in an unstressed condition are substantially parallel, said member having a deflection characteristic so that the ratios between the angular deflections of said shaft and said member are substantially constant when said shaft and said member are deflected in any direction by a pair of constant parallel forces, respectively, and a second device having a sight path associated therewith and affixed to said flexible member so that said second device sight path is substantially parallel to said first device sight path when said first device sight path is at a substantially zero degree elevation angle, said second device producing a bending moment on said member that causes said second device sight path to be substantially parallel to said first device sight path when the elevation angle of said first device sight path is greater than zero degrees.

2. In combination a shaft, a first device having a sight path associated therewith and mounted on said shaft, a flexible member, first means affixing said member to one extremity of said shaft so that the center lines of said shaft and member when in an unstressed condition are substantially parallel, said member having a deflection characteristic so that the ratios between the angular deflections of said shaft and said member are substantially constant when said shaft and said member are deflected in any direction by a pair of constant parallel forces, respectively, a second device having a sight path associated therewith, and second means affixing said second device to said flexible member so that said second device sight path is substantially parallel to said first device sight path when said first device sight path is at a substantially zero degree elevation angle, said second device producing a bending moment on said member that causes said second device sight path to be substantially parallel to said first device sight path when the elevation angle of said first device sight path is greater than zero degrees.

3. A combination in accordance with claim 2 in which said flexible member comprises an annularly shaped diaphragm, said first means affixes the inner periphery of said diaphragm to said shaft and said second means affixes said second device to the outer periphery of said diaphragm.

4. In combination a shaft having a substantially constant angular deflection characteristic, a first device having a sight path associated therewith and mounted on said shaft, a flexible member having a substantially constant angular deflection characteristic, first means affixing said member to one extremity of said shaft so that the center lines of said shaft and member when in an unstressed condition are substantially parallel, a second device having a sight path associated therewith, and second means affixing said second device to said flexible member so that said second device sight path is substantially parallel to said first device sight path when said first device sight path is at a substantially zero degree elevation angle, said second device producing a bending moment on said member that causes said second device sight path to be substantially parallel to said first device sight path when the elevation angle of said first device sight path is greater than zero degrees.

5. A combination in accordance with claim 4 in which said flexible member comprises an annularly shaped diaphragm of uniform thickness, said first means affixes the inner periphery of said diaphragm to said shaft and said second means affixes said second device to the outer periphery of said diaphragm.

References Cited in the file of this patent

UNITED STATES PATENTS

| 2,407,845 | Nemeyer | Sept. 17, 1946 |
| 2,766,473 | Thackara | Oct. 16, 1956 |
| 2,831,186 | Delano | Apr. 15, 1958 |
| 2,879,086 | Perry | Mar. 24, 1959 |

FOREIGN PATENTS

| 503,770 | France | Oct. 10, 1917 |
| 434,384 | Great Britain | Aug. 30, 1935 |
| 761,335 | Great Britain | Nov. 14, 1956 |